Patented Nov. 3, 1953

2,658,073

UNITED STATES PATENT OFFICE 2,658,073

PURIFICATION OF PARA-AMINOSALICYLIC ACID AND ITS ALKALI METAL SALTS

Marrine A. Terpstra, Kirkwood, Mo., assignor to Monsanto Chemical Company, St. Louis, Mo., a corporation of Delaware No Drawing. Application March 18, 1950, Serial No. 150,547

12 Claims. (Cl. 260—519)

This invention relates to para-aminosalicylic acid and its alkali metal salts; more specifically, this invention relates to an improvement in the process for the purification of crude para-aminosalicylic acid and its alkali metal salts, whereby substantially pure para-aminosalicylic acid and its alkali metal salts, substantially free from colored bodies, may be obtained.

Para-aminosalicylic acid and its alkali metal salts have found wide spread utility as a pharmaceutical, particularly in the treatment of tuberculosis. In such an application, exceptional purity is of primary importance. Heretofore substantially pure para-aminosalicylic acid or its alkali metal salts has been most difficult to obtain on a commercial scale.

Various processes are utilized for the production of para-aminosalicylic acid and its alkali metal salts. The most frequently used process is the carboxylation of meta-aminophenol. In all of these processes a crude para-aminosalicylic acid or a crude alkali metal salt of para-aminosalicyclic acid is obtained which contains a considerable quantity of highly colored side reaction products. Heretofore purification of these crude reaction products has been most frequently attempted through the solution of the crude para-aminosalicylic acid as its alkali metal salt in an aqueous medium, treatment of such a solution with activated carbon, removal of the activated carbon and the filterable impurities, and precipitation of para-aminosalicylic acid from such a solution by the addition of a mineral acid. In other words, according to the methods heretofore used, crude para-aminosalicylic acid was purified by the treatment of its alkali metal salt in an aqueous medium followed by acidification and precipitation therefrom of para-aminosalicylic acid.

Such a process of purification has not proved to be a satisfactory commercial process for the purification of crude para-aminosalicylic acid or its alkali metal salts. In order to obtain a para-aminosalicylic acid by this process, substantially free from colored bodies and other impurities, it was found that repeated reprecipitations from the aqueous solution was necessary. Such repeated reprecipitations were exceptionally costly, and due to the loss of product which necessarily accompanies each such unit operation, the yield of the finished product was significantly decreased. It was further found that even if on repeated reprecipitations of crude para-aminosalicylic acid from an aqueous medium a product with a substantially good color was obtained, the assay of the finished material, as determined by ultraviolet absorption techniques, was significantly less than 100%. Thus, according to the purification or refining techniques heretofore used, para-aminosalicylic acid of a pharmaceutical grade was exceptionally difficult to obtain.

It is an object of this invention, therefore, to provide an improved purification process for crude para-aminosalicylic acid and its alkali metal salts.

It is a further object of this invention to provide an improvement in the process for the purification of para-aminosalicylic acid and its alkali metal salts whereby substantially pure para-aminosalicylic acid or its alkali metal salts are obtained, substantially free from colored bodies.

Further objects will become apparent from a description of the novel process of this invention.

Most unexpectedly it has been found that if a crude alkali metal salt of para-aminosalicylic acid is dissolved in water or if a crude para-aminosalicylic acid is converted to its alkali metal salt and dissolved in water, there exists a preferential solubility of the contaminants present in the crude material in the mother liquor as compared to the solubility of the alkali metal salt of para-aminosalicylic acid in the mother liquor. In view of this unexpected phenomenon, a substantially pure alkali metal salt of para-aminosalicylic acid may be isolated from the impurities contained in the crude by crystallization of the alkali metal salt of para-aminosalicylic acid from an aqueous solution of a crude alkali metal salt of para-aminosalicylic acid. According to the novel process of this invention, therefore, crude para-aminosalicylic acid or its alkali metal salt is purified by dissolving the crude as its alkali metal salt in water, followed by crystallization therefrom of the alkali metal salt of para-aminosalicylic acid. The alkali metal salt of para-aminosalicylic acid thus obtained may be recovered by filtration or centrification, washed free from mother liquor and dried. The alkali metal salt of para-aminosalicylic acid thus obtained may be used as such since it is exceptionally pure and essentially free from colored bodies, or it may be converted to para-aminosalicylic acid by acidification. The para-aminosalicylic acid thus obtained is substantially pure and essentially free from colored bodies. The alkali metal salt of para-aminosalicylic acid obtained according to this process may be further purified, if desired, by redissolving in water, treating with activated carbon if further improvement in color is desired, followed by crystallization of the alkali metal salt of para-aminosalicylic acid therefrom or acidification and precipitation of para-aminosalicylic acid therefrom. Precipitation as the acid at this stage is not deleterious as the impurities contained in the crude material have already been separated therefrom in the previous crystallization procedure.

The following examples are illustrative of the novel process of this invention:

*Example I*

50 g. of crude para-aminosalicylic acid, obtained by the carboxylation of meta-aminophenol, was added to a solution of 13 g. of sodium hydroxide contained in 59 g. of water while maintaining a temperature of approximately 30°–40° C. When all of the para-aminosalicylic acid had been added, the batch was heated to 60°–70° C. to effect complete solution and the pH of the solution then adjusted to about 8.5 to about 9.0 by the addition of sodium hydroxide or crude para-aminosalicylic acid. The batch was then slowly cooled to about 0° C. thereby crystallizing sodium para-aminosalicylate dihydrate.

The slurry of sodium para-salicylate was filtered and the filter cake washed with a small amount of water at approximately 0° C.

The sodium para-aminosalicylate was then dissolved in 100 ml. of water and treated with approximately 2.5 g. of activated carbon. The carbon was removed by filtration. The filtrate was then acidified with concentrated hydrochloric acid to a pH of 3.0 to 3.5 thereby precipitating para-aminosalicylic acid. The slurry of para-aminosalicylic acid was cooled to 10° C. and filtered. The cake of para-aminosalicylic acid was washed with cold water until essentially free from chlorides. The filter cake was then dried under reduced pressure at 40–50° C.

The precipitation of para-aminosalicylic acid, filtration of the precipitate and the washing of the precipitate described above, was carried out in an atmosphere of carbon dioxide.

Para-aminosalicylic acid thus obtained is practically white in color and assays approximately 100% by ultraviolet light absorption analytical techniques.

*Example II*

50 parts by weight of crude para-aminosalicylic acid was added to a water solution containing 13 parts by weight of sodium hydroxide and 59 parts by weight of water while maintaining the temperature at approximately 30°–40° C. When all of the para-aminosalicylic acid had been added, the batch was heated to 60°–70° C. to effect complete solution. The pH of the solution was then adjusted to 8.5 to 9.0 by the addition of either sodium hydroxide or crude para-aminosalicylic acid. 23 parts by weight of sodium chloride was then added to the aqueous solution of sodium para-aminosalicylate in order to completely saturate the water present with sodium chloride.

The batch was slowly cooled to 0° C. The slurry of sodium para-aminosalicylate thus formed was then filtered. The filter cake was washed free from mother liquor with cold (0° C.) saturated sodium chloride solution.

The sodium para-aminosalicylate cake thus obtained was redissolved in 225 parts by weight of water and 4.5 parts by weight of activated carbon added in 1.5 parts by weight increments with 15 minutes agitation after each addition. The carbon was then removed by filtration. Under an atmosphere of carbon dioxide, the filtrate was then acidified with concentrated hydrochloric acid to a pH of 3.0 to 3.5 in order to precipitate para-aminosalicylic acid. The slurry was cooled to 10° C. and filtered. The filter cake of para-aminosalicylic acid thus obtained was washed with cold water (10° C.) until essentially free of chlorides. The wet para-aminosalicylic acid was then dried under reduced pressure at 40–50° C.

An excellent yield of substantially pure para-aminosalicylic acid was obtained having the following properties:

Assay (ultraviolet absorption)_____ substantially 100%
Ash _____ 0.02%
Heavy metals (p.p.m.)_____ 12.1
m-Aminophenol _____ 0.16%
Color:
   Lumetron photoelectric colorimeter using 5 g. sample in 30 ml. of a 10% NaHCO₃ water solution contained in 20 mm. cell.

| Filter | Absorbancy |
| --- | --- |
| 660 mµ | 0.040 |
| 575 mµ | 0.070 |
| 515 mµ | 0.193 |
| 490 mµ | 0.215 |

*Example III*

The procedure described in Example II was repeated utilizing acetic acid, in place of concentrated hydrochloric acid, as the acidification agent for the precipitation of para-aminosalicylic acid. An excellent yield of substantially pure para-aminosalicylic acid was obtained having properties substantially identical to those exhibited by the para-aminosalicylic acid obtained in Example II.

*Example IV*

The procedure described in Example II was repeated utilizing sulfuric acid, in place of concentrated hydrochloric acid, as the acidification agent for the precipitation of para-aminosalicylic acid. An excellent yield of substantially pure para-aminosalicylic acid was obtained having properties substantially identical to those exhibited by the para-aminosalicylic acid obtained in Example II.

*Example V*

50 parts by weight of crude para-aminosalicylic acid was added to a solution of sodium hydroxide containing 13 parts by weight of sodium hydroxide and 60 parts by weight of water while maintaining the temperature at approximately 30–40° C. When all of the para-aminosalicylic acid had been added, the batch was heated to 60–70° C. to effect complete solution. The pH of the solution was then adjusted to 8.5 to 9.0 and 23 parts by weight of sodium chloride added. The batch was cooled to 0° C., crystallizing sodium para-aminosalicylate. The sodium para-aminosalicylate was then filtered and washed free of mother liquor. The wet sodium para-aminosalicylate was then dried under reduced pressure at 40–50° C. Sodium para-aminosalicylate, free from colored bodies, was thus obtained.

In contrast to the exceptionally pure para-aminosalicylic acid obtained by the procedure described in Example II wherein the alkali metal salt of para-aminosalicylic acid was isolated from the highly colored bodies contained in the crude material by recrystallization of the alkali metal salt from an aqueous solution, is the relatively poor quality of para-aminosalicylic acid obtained according to the methods of purification heretofore used as exemplified by the following example:

*Example VI*

50 parts by weight of a crude para-aminosalicylic acid was slurried with approximately 70 parts by weight of water. To this slurry was then added approximately 53 parts by weight of an aqueous 25% sodium hydroxide solution while maintaining the temperature below 25° C. The pH of the solution was adjusted to about 7.0 to 7.5. 9 parts by weight of activated carbon was then added in 3 parts by weight increments with 15–20 minutes agitation after each addition. The activated carbon was then removed by filtration and para-aminosalicylic acid precipitated from the aqueous medium by acidification to a pH of 3.0 with hydrochloric acid.

The slurry of para-aminosalicylic acid thus obtained was filtered. The filter cake of para-aminosalicylic acid was redissolved and reprecipitated as para-aminosalicylic acid a second and third time in accordance with the procedure set forth for the first precipitation of para-aminosalicylic acid.

The filter cake of para-aminosalicylic acid thus obtained was dried under reduced pressure at a temperature of about 40–50° C. The para-aminosalicylic acid thus obtained had the following properties:

Assay (ultraviolet absorption) _____ approximately 98%
Ash _____ 0.02%
Heavy metals (p. p. m.) __ 21
m-Aminophenol _____ 0.45%

Color:
Lumetron photoelectric colorimeter using 5 g. sample in 30 ml. of a 10% $NaHCO_3$ water solution contained in a 20 mm. cell.

| Filter | Absorbancy |
|---|---|
| 660 m$\mu$ | 0.708 |
| 575 m$\mu$ | 1.204 |
| 515 m$\mu$ | 1.824 |
| 490 m$\mu$ | 2.036 |

Comparing the physical properties of para-aminosalicylic acid obtained according to the novel process of this invention as set forth in Example II with the properties of para-aminosalicylic acid obtained according to the process as heretofore carried out, as described in Example VI, the outstanding utility of the novel process of this invention is clearly evident. According to the process heretofore used, para-aminosalicylic assaying approximately 98% was obtained in contrast to para-aminosalicylic acid assaying substantially 100% as obtained according to the novel process of this invention. More striking is the difference in color between the materials obtained by these two processes as determined on a Lumetron photoelectric colorimeter. It may be said that the novel process of this invention results in a most significant improvement in the color of the finished product as compared to the product obtained according to the prior art process for the purification of crude para-aminosalicylic acid.

The procedural aspects of the novel process of this invention as set forth in Examples I to V are subject to many variations. For example, in the formation of the alkali metal salt of crude para-aminosalicylic acid in the first step of the process, alkaline materials other than sodium hydroxide may be utilized. The alkali metal carbonates, bicarbonates and hydroxides, such as sodium carbonate, sodium bicarbonate, potassium carbonate, potassium bicarbonate and potassium hydroxide, exemplify other materials which may be utilized in this step.

The concentration of the alkali metal salt of crude para-aminosalicylic acid in the aqueous medium set forth in Examples I to V is also subject to wide variations. However, excessively dilute solutions of the alkali metal salt of para-aminosalicylic acid would cause excessive losses of the product in the mother liquor, and highly concentrated solutions would be difficult to transfer on a plant scale.

Solubility of the alkali metal salt of para-aminosalicylic acid in the mother liquor may be significantly decreased without deleteriously affecting the solubility of the impurities in the mother liquor by saturating the mother liquor with sodium chloride. Utilizing such a procedure necessarily affords a better yield of final product because of the ability to effect a more complete crystallization of the alkali metal salt of para-aminosalicylic acid from a saturated brine solution rather than a water solution. However, the use of a saturated brine solution is not required in order to obtain a finished product having exceptional purity.

The temperature maintained during the solution of the alkali metal salt of para-aminosalicylic acid and its subsequent crystallization may also be varied over a wide range. For practical reasons, elevated temperatures in the range of from about 50–100° C. are preferred during the solution of the crude alkali metal salt of para-aminosalicylic acid in water. During the crystallization of the alkali metal salt of para-aminosalicylic acid from the aqueous solution, lower temperatures are preferred, such as within the range of from about −10° C. to about +20° C. The lower the temperature utilized at this stage of the process, the more complete will be the crystallization of the alkali metal salt of para-aminosalicylic acid from the aqueous medium. The minimum temperature which may be utilized in this process is governed solely by the solidification point of the aqueous medium itself.

It is preferred that the precipitated alkali metal salt of para-aminosalicylic acid be washed with a saturated brine solution rather than water. Again, this preference is not significant from the standpoint of the quality of the finished product but rather from an economical standpoint in that by washing with a brine solution rather than water, a significantly smaller quantity of the alkali metal salt of para-aminosalicylic acid is lost by solution in the washing medium.

The redissolving of the alkali metal salt of para-aminosalicylic acid and subsequent treatment with activated carbon as set forth in Example II is advantageous if an unusually high quality product is desired. If this additional purification step is utilized, any of the well known inert decolorizing agents may be utilized. Typical of such agents are fuller's earth, attapulgus earth, diatomaceous earth, activated carbon, etc. The para-aminosalicylic acid may be precipitated from the aqueous medium by acidification with any acid having an ionization constant higher than the ionization constant of para-aminosalicylic acid. Typical of such acids which may be utilized are the mineral acids, such as hydrochloric acid, sulfuric acid, etc., and organic acids, such as acetic acid. Because of the instability of para-aminosalicylic acid at elevated temperatures in the presence of air, it is preferred that this latter purification step be carried out under an inert atmosphere, such as nitrogen or carbon dioxide.

The pH ranges employed in the various steps of the process for the purification of crude para-aminosalicylic acid may also be varied to a considerable extent. In the preparation of the alkali metal salt of the crude para-aminosalicylic acid, the pH may be maintained in the range of about 7.5 to about 11.0. It has been found, however, that when the pH in this step of the process is maintained within the range of about 8.5 to 9.0, a more effective removal of the colored bodies from the crude para-aminosalicylic acid is possible. During the precipitation of para-aminosalicylic acid in the second purification step, if performed, it is preferred that a pH in the range of from about 2.5 to about 3.5 is recommended for the precipitation of the para-aminosalicylic acid. A lower pH is conducive to the formation of the acid salt. A somewhat higher pH may be employed but a loss in yield will result due to the incomplete precipitation of the para-aminosalicylic acid.

The finished product, whether it be the alkali metal salt of para-aminosalicylic acid or para-aminosalicylic acid, is preferably dried under reduced pressure in order to minimize decomposition. The products may, however, be air dried at moderate temperatures, such as at 35°–45° C.

What is claimed is:

1. In a process for the purification of crude para-aminosalicylic acid and its alkali metal salts, the steps comprising dissolving an alkali metal salt of crude para-aminosalicylic acid in water and while maintaining the pH of the solution so formed in the range of from about 8.5 to about 9.0 crystallizing therefrom the alkali metal salt of para-aminosalicylic acid by cooling said water solution.

2. In a process for the purification of crude para-aminosalicylic acid and its alkali metal salts, the steps comprising dissolving an alkali metal salt of crude para-aminosalicylic acid in water, saturating said water solution of the alkali metal salt of crude para-aminosalicylic acid with sodium chloride, and while maintaining the pH of the solution so formed in the range of from about 8.5 to about 9.0 crystallizing therefrom the alkali metal salt of para-aminosalicylic acid by cooling said water solution.

3. In a process for the purification of crude para-aminosalicylic acid and its alkali metal salts, the steps comprising solubilizing an alkali metal salt of crude para-aminosalicylic acid in water at a temperature in the range of from about 50–100° C. and while maintaining the pH of the solution so formed in the range of from about 8.5 to about 9.0 crystallizing therefrom the alkali metal salt of para-aminosalicylic acid by cooling said water solution to a temperature in the range from about −10° C. to about 20° C.

4. In a process for the purification of crude para-aminosalicylic acid and its alkali metal salts, the steps comprising solubilizing an alkali metal salt of crude para-aminosalicylic acid in water at a temperature in the range of from about 50–100° C., saturating said water solution of the alkali metal salt of crude para-aminosalicylic acid with sodium chloride, and while maintaining the pH of the solution so formed in the range of from about 8.5 to about 9.0 crystallizing therefrom the alkali metal salt of para-aminosalicylic acid by cooling said water solution to a temperature in the range from about −10° C. to about 20° C.

5. The process as described in claim 3 wherein the alkali metal salt of para-aminosalicylic acid is sodium para-aminosalicylate.

6. The process as described in claim 4 wherein the alkali metal salt of para-aminosalicylic acid is sodium para-aminosalicylate.

7. In a process for the purification of crude para-aminosalicylic acid and its alkali metal salts, the steps comprising dissolving an alkali metal salt of crude para-aminosalicylic acid in water, saturating said water solution of the alkali metal salt of crude para-aminosalicylic acid with sodium chloride, and while maintaining the pH of the solution so formed in the range of from about 8.5 to about 9.0 crystallizing therefrom the alkali metal salt of para-aminosalicylic acid by cooling said water solution, recovering and redissolving the alkali metal salt of para-aminosalicylic acid in water, treating the water solution so formed with an inert decolorizing agent, and acidifying and precipitating therefrom para-aminosalicylic acid.

8. In a process for the purification of crude para-aminosalicyclic acid and its alkali metal salts, the steps comprising dissolving an alkali metal salt of crude para-aminosalicyclic acid in water, saturating said water solution of the alkali metal salt of crude para-aminosalicyclic acid with sodium chloride, and while maintaining the pH of the solution so formed in the range of from about 8.5 to about 9.0 crystallizing therefrom the alkali metal salt of para-aminosalicylic acid by cooling said water solution, recovering and redissolving the alkali metal salt of para-aminosalicyclic acid in water, treating the water solution so formed with an inert decolorizing agent, and acidifying the water solution of the alkali metal salt of para-aminosalicyclic acid to a pH in the range of from about 2.5 to about 3.5 by the addition of a mineral acid and precipitating therefrom para-aminosalicyclic acid.

9. The process as described in claim 8 wherein the mineral acid is hydrochloric acid.

10. The process as described in claim 8 wherein the mineral acid is sulfuric acid.

11. The process as described in claim 8 wherein the alkali metal salt of para-aminosalicyclic acid is sodium para-aminosalicylate and wherein the mineral acid is hydrochloric acid.

12. In a process for the purification of crude para-aminosalicyclic acid and its alkali metal salts, the steps comprising dissolving an alkali metal salt of crude para-aminosalicyclic acid in water, saturating said water solution of the alkali metal salt of crude para-aminosalicyclic acid with sodium chloride, and while maintaining the pH of the solution so formed in the range of from about 8.5 to about 9.0 crystallizing therefrom the alkali metal salt of para-aminosalicyclic acid by cooling said water solution, recovering and redissolving the alkali metal salt of para-aminosalicyclic acid in water, treating the water solution so formed with an inert decolorizing agent, and acidifying the water solution of the alkali metal salt of para-aminosalicyclic acid to a pH in the range from about 2.5 to about 3.5 by the addition of acetic acid, and precipitating therefrom para-aminosalicyclic acid.

MARRINE A. TERPSTRA.

References Cited in the file of this patent

UNITED STATES PATENTS

| Number | Name | Date |
|---|---|---|
| 427,565 | Gnehm et al. | May 13, 1890 |
| 563,993 | Welter | July 14, 1896 |
| 1,973,574 | Marshall | Sept. 11, 1934 |
| 2,540,104 | Doub | Feb. 6, 1951 |
| 2,540,785 | Hultquist | Feb. 6, 1951 |
| 2,548,257 | Goldberg et al. | Apr. 10, 1951 |
| 2,580,195 | Rosdahl | Dec. 25, 1951 |

FOREIGN PATENTS

| Number | Country | Date |
|---|---|---|
| 153,576 | Germany | July 25, 1904 |

OTHER REFERENCES

MacArdle, "Solvents in Syn. Org. Chem." (Van Nostrand), pp. 158–159 (1925).

Gatterman, "Organic Chem." (Macmillan), pp. 1–5 (1896).

Rosdahl, Svensk. Kem. Tid., vol. 60, p. 13 (Jan. 1948).